May 22, 1951
E. R. FLYNN
2,553,570
FACING DEVICE
Filed Aug. 9, 1945
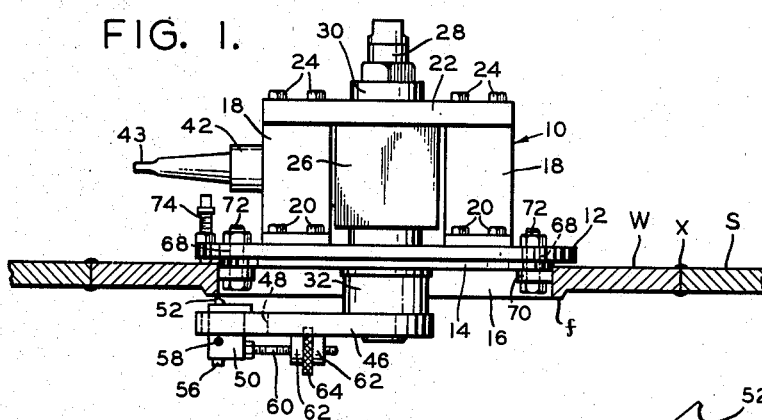
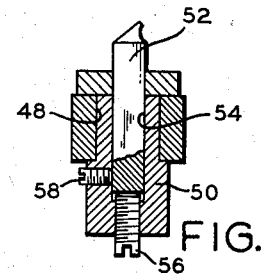
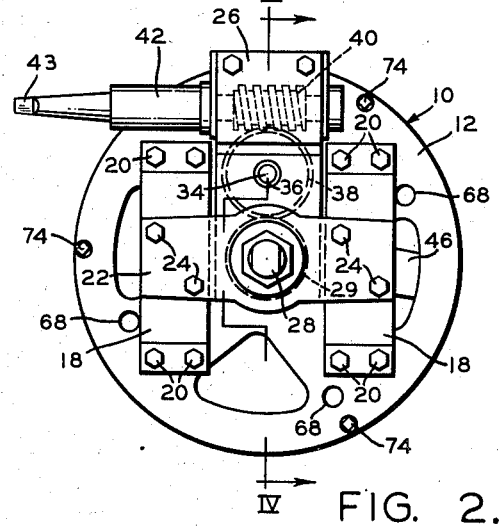
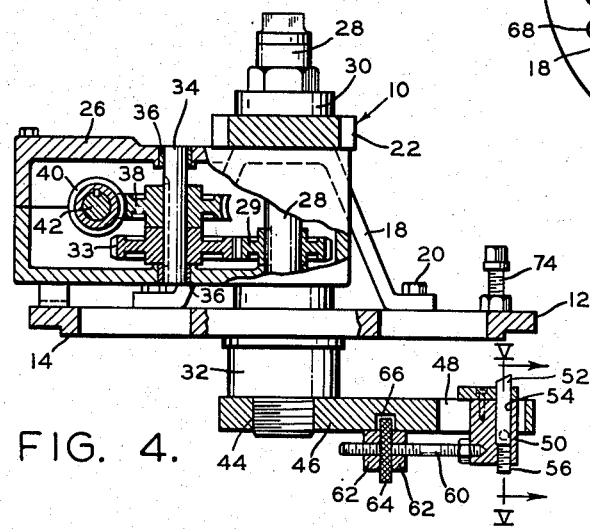
INVENTOR
EDWARD R. FLYNN
BY Ralph L Chappell
ATTORNEY Patented May 22, 1951

2,553,570

UNITED STATES PATENT OFFICE 2,553,570

FACING DEVICE

Edward R. Flynn, Waltham, Mass.

Application August 9, 1945, Serial No. 609,914

3 Claims. (Cl. 82—4)

(Granted under the act of March 3, 1883, as amended April 30, 1928; 370 O. G. 757)

This invention relates to a device for facing surfaces and more particularly to a device for facing an under surface, the location of which is not readily accessible for the application of ordinary tools used for this purpose.

In certain types of construction it is necessary to true up a surface of a component workpiece such as, for instance a valve seat, that has become distorted during the welding thereof to the main body of a structure. Often, the structure to which the component workpiece has been welded, is so bulky or unwieldy as to preclude its being brought to or operated upon by a conventional machine tool for the refacing of the distorted surface of the welded part.

It is an object of the present invention, therefore, to provide a device that may be readily adjusted in position with respect to a workpiece after the latter has been welded to a cumbersome structure, and whereby the refacing operation may be quickly and easily performed even though the face to be turned is an under surface and its location lies within a more or less confined area.

Another object of the invention is to provide a facing device with means for quickly and easily adjusting the device into proper position with respect to the face to be turned.

A further object of the invention is to provide a device of this character with a simple and effective means that is conveniently operable within a confined location, for altering the radius adjustment of the cutting tool during its rotation on the surface to be faced.

With the above and other objects and features in view, the invention will now be described with reference to the accompanying drawings which illustrate a preferred embodiment of the invention and will be pointed out in the claims.

In the drawings:

Fig. 1 is a side elevation of the improved facing device showing it mounted upon a workpiece;

Fig. 2 is a top plan view thereof;

Fig. 3 is a bottom plan view thereof;

Fig. 4 is a sectional elevation taken along the line IV—IV of Fig. 2; and

Fig. 5 is a sectional elevation of the cutting tool and its holder taken along the line V—V of Fig. 4.

In Fig. 1 the device, generally indicated at 10, is shown as applied to a workpiece W. The workpiece W is illustrated as having been welded at $x$ to the structure S. Very frequently, during the welding operations, the workpiece W buckles or bends causing the face $f$ of the workpiece to become distorted.

The face $f$ is representative of a valve seat or other surface that requires precise alignment to insure its proper cooperation with another element such as a valve or the like. Therefore, the engaging surface must be refaced to insure proper and true alignment. Since the structure S may be so unwieldy or bulky as to make it impracticable to bring the assembly to a machine when the refacing operation could be performed in the usual manner other means for refacing the surface must be provided. It is toward the provision of these means that the present invention is directed.

The facing device includes a circular support or plate 12 having a reduced portion 14 on its underside. The portion 14 is of just sufficient diameter to fit within a corresponding opening 16 provided in the workpiece W. Spaced, upstanding, inverted U-shaped brackets 18 are secured to the top of plate 12 by screws 20. A bar 22 is secured across the brackets 18 by screws 24. Within the enclosure formed by the brackets 18 and the bar 22 there is secured a gear box 26 that extends outwardly from one side of the brackets. A vertically disposed spindle 28 passing through the gear box 26 is rotatably journaled at its upper end in an upstanding bearing 30 supported on the bar 22. The lower end of the spindle 28 is journaled in a bearing 32 formed integrally with and depending from the underside of plate 12. A gear 29 (Fig. 4) is keyed to the spindle 28 within the gear box 26. The gear 29 meshes with a gear 33 that is keyed to a stub shaft 34 journaled at its opposite ends in bearings 36 fixed in the top and bottom of the gear box 26. A worm gear 38 keyed to the shaft 34 immediately above the gear 33 meshes with a worm 40 which, in turn, is keyed to a horizontally disposed shaft 42. The shaft 42 is journaled for rotation in suitable bearings provided in the outwardly extending portion of gear box 26. The outer, free end of shaft 42 is tapered and slabbed as at 43 to provide for the connection thereof with a suitable source of power such as a pneumatic or electric motor (not shown). By the connections just described, rotation of shaft 43 by the motor causes the spindle 28 to be rotated.

The lower end of the spindle 28 extends below the bearing 32 and has fixed thereon as at 44 a horizontally disposed arm 46. The outer end of arm 46 is provided with an internal slot 48 in which is slidably mounted a tool holder 50. A cutting tool 52 is mounted within a bore 54 provided in the holder. The tool 52 is arranged to be raised or lowered in the holder by taking up or backing off, respectively, a screw 56 threaded in the bottom of the holder and having its inner end engaging the bottom of the tool. The tool 52 is arranged to be locked in adjusted position by a set screw 58 threaded in one side of the holder and having its inner end engaging the side of the tool.

The means for variably adjusting the radius of the tool 52 with respect to the axis of the spindle 28 comprises a threaded stud 60. The stud 60 is secured at one end to the holder 50 and has its opposite free end extending with clearance through bores provided in spaced lugs 62 secured to and depending from the underside of arm 46. A knurled nut 64 is threaded upon the stud 60 between the lugs 62. A portion of the nut 64 extends upwardly into a recess 66 provided in the underside of the arm 46, sufficient clearance being provided between the internal walls of the recess and surfaces of the nut to permit of its free rotation. However, since the nut is held from lateral movement by the lugs 62, upon rotation of the nut in one direction, the stud 60 is moved in a direction to pull the slide 50 and tool 52 toward the axis of the spindle 28 to decrease the radius. Conversely, upon rotation of the nut 64 in an opposite direction the stud 60 will be moved in a direction to move the slide 50 and tool 52 away from the axis of the spindle 28, to increase the radius.

Four openings 68 provided in the plate 12 are arranged to be positioned in alignment with four corresponding openings provided in tongues 70 that project inwardly from the wall of the opening 16. Bolts such as 72 passing through the openings 68 and the openings in the tongues 70 secure the device firmly in position upon the workpiece W preparatory to the facing operation.

The means for assuring the proper leveling of the device before the commencement of the facing operation comprises three adjusting screws 74 spaced 120° apart adjacent to the periphery of the plate 12. The lower ends of the screws 74 are arranged to bear against the upper surface of the workpiece W. By individually taking up and letting off on the adjusting screws 74 and the plate 12, arm 46 and tool 52 may be accurately adjusted into precisely the proper plane with respect to the face f, to insure the desired facing operation. The adjustment just described is, of course, made before taking up on the securing bolts 72.

In operation, the device is mounted upon the workpiece as described in the foregoing. Following the leveling adjustment by screws 74 and the securing adjustment by bolts 72, the tool 52 is elevated into proper height with respect to the face f by adjustment of screw 56, following which the tool is secured in position by taking up upon screw 58. The initial radius adjustment is made by turning the nut 64 to bring the cutting edge of the tool into proper position with the face f, to be trued. Now, the motor (not shown) which is attached to the end 43 of shaft 42 is started. This causes the spindle 28 and arm 46 to be driven in rotation whereupon the cutting tool 52 commences the facing operation on the face f. As the arm 46 and the spindle 28 continue in their rotation the radius of the tool 52 is increased by slight increments following each complete revolution thereof. This is effected by the operator simply giving the nut 64 a slight turn in the appropriate direction to cause the stud 60, slide 50 and tool 52 to be moved outwardly a slight extent following each complete revolution of the tool until finally the entire lower surface of the face f has been smoothly and efficiently faced.

It has been found in practice, that the simplicity of the radius adjustment by means of simple turning of the nut 64 permits the device to be used in compact or confined locations and, through the use of the device facing operations of the character above described are facilitated and expedited to a marked degree.

The invention described herein may be manufactured and used by or for the Government of the United States of America for Government purposes without the payment of any royalty thereon or therefor.

Having described my invention what I claim as novel and desire to protect by Letters Patent of the United States is:

1. Apparatus for facing the under surface of a workpiece, said apparatus comprising a substantially circular support, a spindle centrally disposed upon said support and positioned perpendicularly thereof, said support including a reduced diameter section substantially equal in diameter to the diameter of said opening, said reduced diameter section being adapted to position said support centrally over said opening, at least one securing device extending through said support fastening said workpiece, said securing device being disposed entirely above the surface to be faced, a plurality of adjusting screws extending through said support and engaging the upper surface of said workpiece for leveling said support with respect to said workpiece, a radially extending arm mounted upon said spindle, said arm being disposed adjacent said under surface, a cutting tool mounted on said arm with its cutting edge directed toward said support and engageable with said under surface, means for displacing said tool along said arm radially of said spindle, means for displacing said tool perpendicularly of said arm toward said under surface, and means including a reduction drive secured to said support for rotating said spindle.

2. Apparatus for facing the underside of a workpiece in an annular area surrounding a substantially circular opening in said workpiece, said apparatus comprising, a support having a first cylindrical section and a second coaxial cylindrical section adjacent said first section and secured thereto, said support being formed with a central opening coaxial with said first and second cylindrical sections, said second section being of smaller diameter than said first section and having a fit with respect to said workpiece opening preventing radial movement of said support with respect to workpiece opening, said first cylindrical section overhanging the overside of said workpiece in an annular area surrounding said workpiece opening, a plurality of screws extending through said support at its first section and engaging the overside of said workpiece for leveling said support with respect to said workpiece, a plurality of securing devices extending through said support fastening said support to said workpiece, a spindle disposed centrally of said support and extending coaxially through said central opening, a radially extending arm mounted on said spindle, said arm being disposed adjacent the underside of said workpiece, a cutting tool mounted on said arm and having a cutting edge directed toward said support and engageable with said underside of said workpiece, means for displacing said tool along said arm radially of said spindle, means for displacing said tool perpendicularly of said arm toward said underside of said workpiece, and means including a reduction drive secured to said support on the overside thereof for rotating said spindle.

3. Apparatus for facing the underside of a workpiece in an annular area surrounding a substantially circular opening in said workpiece, a flanged cylindrical member fitted within said workpiece opening in a manner normally allowing movement coaxially of said workpiece opening and restricting movement radially of said opening, the flanged portion of said cylindrical member overhanging the overside of said workpiece in an annular area adjacent said workpiece opening, said flanged cylindrical member being formed with a first bearing member depending from the underside thereof, said bearing member having a vertical bearing opening coaxial with said workpiece opening, the vertical direction being that driection normal to the overside and underside of said workpiece, a plurality of screws extending vertically through said flanged portion of said cylindrical member and engaging the overside of said workpiece for leveling said cylindrical member with respect to said workpiece, said flanged cylindrical member being further formed with a number of vertical openings, fastening means extending through said flanged cylindrical member for securing said cylindrical member to said workpiece, first and second vertically disposed, inverted, U-shaped, brackets secured to said flanged cylindrical member at its flanged overside portion in a spaced apart relationship, a horizontally disposed bar secured at first and second ends thereof to the upper, closed ends of said first and second inverted U-shaped brackets respectively, said bar being formed with a second bearing member intermediate the ends thereof, the bearing opening in said second bearing member being in axial alignment with the bearing opening in said first bearing member, a vertically disposed spindle journaled at its upper end in said second bearing member and at its lower end in said first bearing member, said spindle being coaxially disposed with respect to said workpiece opening, a gear box disposed on the overside of said flanged cylindrical member and between said first and second U-shaped brackets, said gear box including a gear train and a rotatable drive shaft coupled to the first gear of said train, the last gear of said train being journaled on said spindle and keyed thereto whereby rotary motion imparted to said drive shaft results in rotary movement of said spindle within said first and second bearing members, a radially extending arm secured to said spindle at its lower end, a cutting tool mounted on said arm and having a cutting edge directed toward, and engageable with, the underside of said workpiece, means for displacing said tool along said arm radially of said spindle and means for displacing said tool in a direction parallel to said spindle.

EDWARD R. FLYNN.

REFERENCES CITED

The following references are of record in the file of this patent:

UNITED STATES PATENTS

| Number | Name | Date |
| --- | --- | --- |
| 1,625,800 | Edwards | Apr. 26, 1927 |
| 1,747,944 | Lyne | Feb. 18, 1930 |
| 1,795,323 | Wade et al. | Mar. 10, 1931 |
| 2,211,134 | Kruell | Aug. 13, 1940 |
| 2,283,323 | Erhardt | May 19, 1942 |

FOREIGN PATENTS

| Number | Country | Date |
| --- | --- | --- |
| 198,621 | Great Britain | June 7, 1923 |